April 11, 1961   L. J. PIRCON   2,979,411
METHOD OF PROCESSING MEAT
Filed April 26, 1957
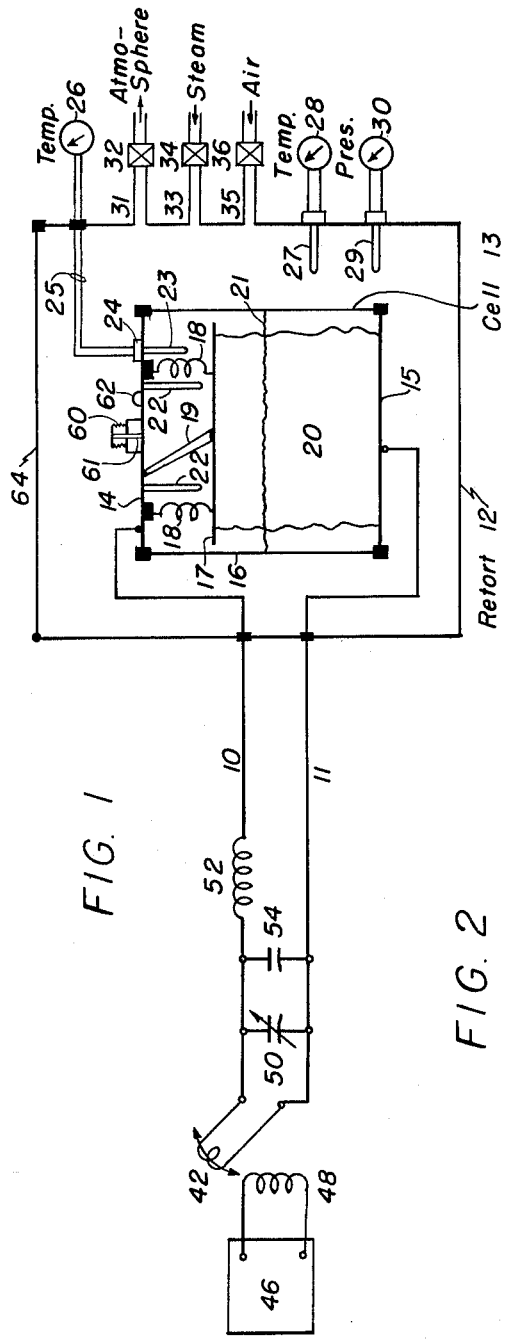
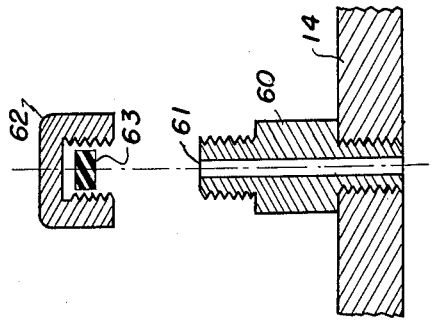
INVENTOR.
Ladislav J. Pircon
BY
ATTYS.

United States Patent Office 2,979,411
Patented Apr. 11, 1961

2,979,411
METHOD OF PROCESSING MEAT

Ladislav J. Pircon, Stickney, Ill., assignor to A. W. Brickman, Victor Conquest, Frank J. Madden, Wrisley B. Oleson, and Emery T. Filbey, all of Chicago, Ill., as trustees for the benefit of American Meat Institute Foundation, Chicago, Ill., a non-profit corporation of Illinois Filed Apr. 26, 1957, Ser. No. 655,205

5 Claims. (Cl. 99—187)

The invention is directed to a novel method of and apparatus for processing food material, and more particularly to a method of and apparatus for uniformly increasing the thermal energy in meat and similar current-conducting organic materials.

Various methods of and structures for preparing edible materials are known in the food processing arts. It is known, for example, to employ resistance heating which effects ionic motion in the heated mass by securing the meat between a pair of electrodes, and passing an electric current from one electrode through the meat to the opposite electrode. It is also known to employ dielectric heating, in which process the meat to be prepared is positioned together with a dielectric between a pair of electrodes, and high-frequency electrical energy is coupled to the electrodes. Although certain advantages are realized by these methods of meat preparation, it is usually difficult to secure a uniform temperature increase in the heated mass by either of these methods.

An improvement upon these early methods of food preparation is an invention which combines resistance and dielectric heating, thereby achieving both ionic and molecular motion in the mass being processed. This simultaneous utilization of both resistance and dielectric heating is taught in applicant's copending application entitled "Method of and Apparatus for Thermatronic Heating," filed September 14, 1954, Serial No. 455,945, now Patent No. 2,896,054, issued July 21, 1959, and assigned to the assignees of this invention.

This copending application discloses a substantial advance in the food preparation art, and materially enhances the uniformity of the thermal energy distribution throughout the heated mass when processed according to the teaching of that application. However, because the meat to be processed is usually of appreciable size, and likewise because the electrical energy must be applied externally, it is evident that some temperature gradient throughout the processed meat will usually be present.

It is an object of this invention to provide a method of and apparatus for the thermal processing of meat or similar current-conducting materials, by which a substantially uniform temperature distribution throughout the processed mass is achieved during the processing thereof.

It is a further object of the invention to effect a portion of such uniform thermal processing by a flash vaporization process.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1 is a diagrammatic illustration, partly schematic and partly sectional, of an embodiment of the invention; and Figure 2 is a sectional view of a portion of the structure illustrated in Figure 1.

The teaching of the combination of resistance and molecular heating, in addition to the advantages which are secured by such combination, is set forth in the aforementioned copending application. The apparatus employed to provide the high-frequency energy for processing the meat is shown in the left-hand portion of Figure 1 of this application, and is designated by reference numerals identical to those employed in the copending application.

In greater detail, Figure 1 illustrates a source 46 of high-frequency energy, such as an oscillator, the output terminals of which are coupled to each end of an output coil 48. A variable pick-up coil 42 is positioned adjacent coil 48 so that by altering the position of pick-up coil 42, the amount of energy coupled from coil 48 to coil 42 can be varied. Across the output terminals of pick-up coil 42 are connected a variable capacitor 50 and a fixed capacitor 54. Capacitor 50 may be adjusted so that, in conjunction with the mutual inductance variation effected by varying the position of pick-up coil 42 with respect to fixed output coil 48, the load impedance presented by the meat can be matched to the impedance of the energy-providing circuit. A filter inductance 52 is serially connected between one terminal of pick-up coil 42 and one of the electrodes of the meat-processing apparatus. The impedance relationships between these electrical devices and the meat in the processing cells are set forth in detail in the above-identified copending application.

The output of oscillator 46, as modified by the electrical devices coupled thereto, is coupled along conductors 10 and 11 through suitable insulated apertures of a retort 12, through similar apertures in a cell 13, the conductors being connected to an upper electrode 14 and a lower electrode 15, which form end seals for the cylindrical portion 16 of the cell. Portion 16 is constructed of a suitable transparent and insulating substance. A window area (not shown) in retort 12 permits viewing the interior of cell 13. The cell structure itself is disclosed in detail in applicant's copending application entitled "Thermatronic Processing and Container-Cell Combination," filed September 14, 1954, Serial No. 455,946, now Patent No. 2,807,698, issued September 24, 1957, and assigned to the assignees of this invention.

A movable electrode 17 is secured to upper electrode 14 by a pair of spring members 18, 18. A metallic ribbon 19 of suitable conducting material is connected to upper electrode 14 and to movable electrode 17 to effect good electrical contact therebetween. A mass of meat 20 or other material to be processed is disposed between the movable electrode 17 and lower electrode 15. During the processing of the meat 20, a pool 21 of meat juices is formed in the cell 13 as the juices are driven from the meat. During processing, the meat normally expands and displaces the movable electrode 17 upwardly; this upward movement is limited by stop members 22, 22, connected to upper electrode 14. The length of the stop members 22, 22 is such as to protect the probe portion 23 of a temperature sensing device 24, disposed in the upper electrode 14 to measure the temperature within cell 13. A pair of conductors 25 is connected between the device 24, through a gasket or other suitable insulated aperture in the wall of retort 12, and a temperature indicating device 26 mounted outside retort 12. Another temperature measuring instrument 27 is disposed within retort 12 to measure the temperature therein, and this temperature is displayed on a temperature indicating device 28 mounted exteriorly of retort 12. A pressure sensitive device 29 is mounted within retort 12; the pressure thus measured is displayed upon an indicating device 30 mounted outside retort 12.

A first pipe line 31 is connected in the right hand wall of retort 12; a two-position valve 32 is positioned in this line, and leads to the atmosphere on the side of the valve farther from retort 12. Another pipe line 33 couples retort 12 to a source of steam under pressure; a two-position valve 34 is inserted in this line. A third pipe line 35, in which a two-position valve 36 is positioned, is coupled between the retort 12 and a source of air under pressure.

Figure 2 illustrates a nipple bushing 60 mounted in the upper electrode 14, which is also the cover of processing cell 13. The lower portion of nipple bushing 60 is threaded for engagement with corresponding threads in upper electrode 14. An orifice 61, approximately 1/16 inch in diameter, is provided along the axis of nipple bushing 60, connecting the interior of processing cell 13 with the gases contained within retort 12. The upper portion of bushing 60 is threaded for engagement with corresponding threads of a cap member 62, arranged to screw down on the top of the nipple bushing 60 and thus close orifice 61. A rubber member 63 may be disposed between the cap member 62 and the upper portion of nipple bushing 60 to effect a good seal of the orifice 61. Figure 1 likewise illustrates the nipple bushing 60 disposed in upper electrode 14, and as there shown, the cap member 62 is resting on upper electrode 14, permitting orifice 61 to connect the atmospheres of retort 12 and cell 13.

A hinged cover plate 64 is provided in the top of retort 12; the plate 64 is closely adjacent the nipple bushing 60.

Referring now to the inventive process, the manner of inserting the meat 20 in cell 13 for processing will be understood from the detailed explanation of the structure of cell 13 given in the aforementioned Patent No. 2,807,698. The cell is placed within retort 12 by opening the hinged cover plate 64, inserting this cell, and again closing the cover plate. Electrical energy is applied from the oscillator 46 to the coupling structure to electrodes 14 and 15, as taught in Patent No. 2,896,054. At the heating process commences, valves 32, 34 and 36 are closed; the cap member 62 is placed on top of electrode 14, so that the orifice 61 within nipple bushing 60 connects the atmospheres of cell 13 and retort 12.

This heating process continues until the temperature in cell 13, as indicated on device 26, reaches approximately 212° F.

It is noted that the probe member 23 of the temperature-measuring device 24 extends into the atmosphere of cell 13. However, it usually occurs that during processing the level of the meat juices 21 rises considerably above that illustrated in the drawing, so as to contact the probe portion 23 of device 24. Thus an accurate indication of the temperature of the processed material is coupled to the indicating device 26. However, even when the level of the liquid 21 does not rise sufficiently high to contact probe member 23, there is substantial vaporization of the liquid 21 within cell 13, which vapor contacts the probe member 23. Accordingly, the temperature indicated by device 26 is very close to that of the meat 20 and juices 21, whether or not the juices rise to a level permitting contact with the lower portion of probe member 23.

As the temperature indicated on device 26 reaches about 212° F., the oscillator 46 is de-energized; the two-position valve 34 is opened to admit steam under pressure through pipe line 33 into retort 12. The admittance of steam into retort 12 raises the pressure therein, and, because orifice 61 is not capped, such increase is similarly effective to raise the pressure within cell 13. Following such increase in pressure, additional energy can be coupled from oscillator 46 to the meat 20, to further raise the temperature of the meat. Additionally, the steam is effective to continue the heating of the meat 20. In the processing of ham, for example, where it is desired to obtain a temperature of from 235° to 240° F., it has been found that the admittance of steam to obtain a pressure of 10–15 pounds (above atmospheric pressure) is sufficient to obtain such temperature. If control of both temperature and pressure is desired, air may be admitted in pipe line 35 by opening valve 36, and mixing the air from pipe line 35 with steam from line 33 within retort 12 to achieve the desired temperature and pressure conditions.

The length of the processing time depends, as is well known and understood by those skilled in the art, upon the mass of the processed material, the temperature attained, and the pasteurization, sterilization, or $F_0$ value which is desired to be obtained. The $F_0$ value, which is roughly an indication of the bacteria "kill," is a function of both temperature and time. In the processing of ham, it has been noted that as the desired temperature and pressure are reached the juices 21 within the cell 13 are sufficiently heated to produce a fairly uniform and lively bubbling action. If desired, this reaction can be permitted to subside and then more steam released to again produce the bubbling reaction; such repetition of this portion of the cycle enables attainment of an $F_0$ value of the order of two to four. After the desired value has been reached (as noted on the temperature indicating device 28 and the pressure indicating device 30, and as bubbling action is noted through the transparent cylindrical portion 16 of the cell 13 and the window portion, not shown, of retort 12), valves 34 and 36 are closed to again seal the retort from the atmosphere.

In accordance with the invention, venting is provided by rapidly opening the two-position valve 32, equalizing the pressures in retort 12 and cell 13 with atmospheric pressure. It appears that this rapid pressure change is effective to produce agitation of the liquid or moisture in the processed material, and that such agitation contributes to the equalization of temperature throughout the material. Accordingly, if it is desired to process material containing no liquid or moisture therein, it is desirable to add liquid to the material before the processing is commenced. This rapid and sudden venting, or pressure equalization, also causes the volatilization of the liquid 21 within cell 13. As the liquid volatilizes, the vapor formed begins to pass through orifice 61 into retort 12, but this passage is kept at low volume because of the small orifice diameter. Before any substantial part of the vapor from the juices can thus be lost, the hinged cover plate 64 of retort 12 is raised; this permits a worker using an asbestos glove to raise the cap member 62 and screw the cap member over the nipple bushing 60, thus sealing the orifice 61.

It is apparent that the agitation in the cell can also be effected by producing a pressure in the retort lower than the pressure in the cell even if the cell pressure is below atmospheric pressure; means for drawing a vacuum are well known and understood in the art.

Prior art food heating processes have produced temperature distributions varying as much as 60–100° F. in the product. Practice of the invention has produced material in which the temperature variation is only several degrees, illustrating the substantial improvement in the food processing art afforded by the inventive structure and process. This uniform temperature distribution, realized by practice of the invention, contributes substantially to the sterilization of a meat product, such as ham, for example, to obviate the necessity for refrigeration of such meat during shipping and storage. Clearly such result is economical, in that refrigerating costs are minimized, but another important benefit accruing from practice of the invention is that such foods are made available for consumption in locations where refrigeration is scarce or non-existent. For example, meat may be made available to military personnel stationed in tropical climates and far removed from any means of refrigeration. Thus the novelty and utility of the inventive apparatus and method is apparent.

What is claimed is:

1. The method of processing meat which comprises the steps of placing said meat in a retort, coupling electrical energy to said meat to raise the temperature of the meat to a desired value, creating a pressure differential between the pressure in said retort and the pressure of the atmosphere external to said retort, and suddenly venting said retort to said external pressure to effect agitation of the liquid in the meat and thereby produce a substantially uniform temperature distribution throughout said meat.

2. The method of processing meat which comprises the steps of placing said meat in a container located in a retort, coupling electrical energy to said meat to raise the temperature thereof to a desired value, introducing steam under pressure greater than atmospheric pressure into said retort, coupling additional energy to said meat to further raise the temperature thereof, and suddenly venting said retort to effect agitation of the liquid in said meat to thereby produce a substantially uniform temperature distribution throughout said meat.

3. The method of processing meat which comprises the steps of placing said meat in a container located in a retort, coupling electrical energy to said meat to raise the temperature thereof, introducing a mixture of air and steam into said retort to permit further increase of the temperature of said meat with the further application of electrical energy thereto and to simultaneously create a pressure differential between the pressure within said retort and container relative to the pressure external to said retort and container, and suddenly venting said retort to said external pressure to effect agitation of the liquid in said meat to thereby produce a substantially uniform temperature distribution throughout said meat.

4. The method of processing meat which comprises the steps of placing said meat in a retort, heating said meat by a combination of resistance and dielectric heating to raise the temperature of said meat to a desired value, creating a pressure differential between the pressure in said retort and the pressure of the atmosphere external to said retort, and suddenly venting said retort to said external pressure to effect agitation of the liquid in said meat and thereby produce a substantially uniform temperature distribution throughout said meat.

5. The method of processing meat which comprises the steps of placing said meat in a container located in a retort, heating said meat by a combination of resistance and dielectric heating to raise the temperature of said meat to a desired value, introducing steam under pressure into said retort to permit further increase of the temperature of said meat responsive to the further heating thereof and to simultaneously create a pressure differential between the pressure within said retort and container and the pressure of the atmosphere external to said retort and container, and suddenly venting said retort to said external pressure to effect agitation of the liquid in said meat to thereby produce a substantially uniform temperature distribution throughout said meat.

References Cited in the file of this patent
UNITED STATES PATENTS

| | | |
|---|---|---|
| 2,472,970 | Hanna | June 14, 1949 |
| 2,488,164 | Bowman | Nov. 15, 1949 |
| 2,488,165 | Bowman et al. | Nov. 15, 1949 |
| 2,569,645 | Viall | Oct. 2, 1951 |
| 2,649,380 | Flynn | Aug. 18, 1953 |
| 2,794,385 | Inghram | June 4, 1957 |